United States Patent [19]
Kelley et al.

[11] Patent Number: 6,126,185
[45] Date of Patent: Oct. 3, 2000

[54] ENERGY STORAGE DEVICE FOR PERSONAL VEHICLE

[76] Inventors: Don Kelley, 3718 W. Point Dr.; Carl Sisemore, 905 N. Willow Ave., Apt. E-6-E; James Corbeil, 2545 W. Broad St., Apt. B-6, all of Cookville, Tenn. 38501

[21] Appl. No.: 09/449,461

[22] Filed: Nov. 27, 1999

Related U.S. Application Data

[62] Division of application No. 08/978,565, Nov. 16, 1997, Pat. No. 6,019,385.

[51] Int. Cl.[7] ....................................................... B62M 1/10
[52] U.S. Cl. ............................................................. 280/217
[58] Field of Search ................................. 280/212, 215, 280/217, 230, 259, 260, 261

[56] References Cited

U.S. PATENT DOCUMENTS

| | | | |
|---|---|---|---|
| 1,329,940 | 2/1920 | Wallace | 280/217 |
| 2,141,233 | 12/1938 | Alexander | 280/217 |
| 3,894,614 | 7/1975 | Lew | 185/39 |
| 3,915,267 | 10/1975 | Shea | 192/5 |
| 4,037,854 | 7/1977 | Large | 280/217 |
| 4,147,244 | 4/1979 | Segawa et al. | 192/6 |
| 4,272,094 | 6/1981 | Patrin | 280/217 |
| 4,305,599 | 12/1981 | Houston | 280/212 |
| 4,353,569 | 10/1982 | Molina | 280/217 |
| 4,445,701 | 5/1984 | Stroud | 280/217 |
| 5,242,335 | 9/1993 | Kutter | 475/4 |
| 5,443,284 | 7/1995 | Chou | 180/205 |
| 5,487,442 | 1/1996 | Hua | 180/220 |

*Primary Examiner*—Kevin Hurley
*Attorney, Agent, or Firm*—Joseph A. Marasco

[57] ABSTRACT

An energy storage device includes, in combination: a vehicle adapted for propulsion via energy supplied by an operator, the vehicle having a pedal crank and a coaster brake hub disposed about an axle of a wheel of the vehicle, the pedal crank and the coaster brake hub being disposed in operable communication for transmitting energy from the pedal crank to the coaster brake hub and thence to the wheel; an energy storage device for selectively storing energy and selectively applying the stored energy, the energy storage device being disposed in operable communication with the pedal crank for transmitting energy from the pedal crank to the energy storage device for storage of the energy, and the energy storage device being disposed in operable communication with the coaster brake hub for selectively transmitting stored energy from the energy storage device to the coaster brake hub; and, combining device for differentially combining instant energy supplied by the operator and the energy storage device so that the energy applied to the coaster brake hub is essentially the sum of the instant energy supplied by the operator and the energy storage device.

7 Claims, 3 Drawing Sheets

ENERGY STORAGE DEVICE FOR PERSONAL VEHICLE

This application is a divisional application of U.S. patent application Ser. No. 08/978,565 which was filed on Nov. 16, 1997, U.S. Pat. No. 6,019,385 the entirety of which is incorporated herein by reference.

The present invention relates to energy storage devices adapted for use with bicycles and other personal vehicles, and more particularly to those which employ a differential and a coaster brake in combination. Disclosure Document No. 409525, filed in the United States Patent and Trademark Office on Dec. 16, 1996, is hereby expressly referenced.

Bicycles having coaster brakes are not generally suitable for derailleur type gearing for slow and fast speeds. The operator (rider) generally cannot produce sufficient energy to pedal such bicycles up steep grades, and must stop, dismount, and push the bicycle up the grade.

Accordingly, there are several objects and advantages of the present invention, including the provision of an energy storage device suitable for application in bicycles equipped with coaster brakes. The operator inputs energy to the energy storage device on level and downhill grades, and selectively uses the energy stored therein to augment the operator's real time energy on uphill grades. Thus, instead of gearing down when climbing a grade, the energy storage device supplies extra energy as needed.

Such an energy storage device should release its stored energy on demand, be safe, and of minimum weight. The added power, in terms of an acceleration, should be smooth. The operator should not be jolted, nor should the font wheel leave the ground—i.e. a "wheelie" should not occur as a result of acceleration due to energy input from the energy storage device. Safety considerations deem it necessary that the pedals should not overrun the operator, nor should the operation of the coaster brake be impeded in any way, during the release of energy from the energy storage device.

A bicycle having such an energy storage device should function on its own, a one time purchase free of external needs. To minimize cost, modifications to the existing frame should be minimal or unnecessary. It is important that a bicycle equipped with an energy storage device should maintain current and familiar bicycle operations. A person should not have "relearn" how to ride a bicycle in order to enjoy the benefits of the device.

Moreover, the rear coaster brake hub of a bicycle equipped with such an energy storage device should be adapted to simultaneously receive energy independently from the operator and from the energy storage device and efficiently apply that energy to the drive wheel. The energy storage device should be able to apply energy to the drive wheel while operating at one speed while the operator is pedaling at another speed, with the hub combining the two inputs so that the sum thereof is delivered to the drive wheel.

Further and other objects and advantages of the present invention will become apparent from the description contained herein.

SUMMARY OF THE INVENTION

In accordance with one aspect of the present invention, the foregoing and other objects are achieved by an energy storage device which includes, in combination: a vehicle adapted for propulsion via energy supplied by an operator, the vehicle having a pedal crank and a coaster brake hub disposed about an axle of a wheel of the vehicle, the pedal crank and the coaster brake hub being disposed in operable communication for transmitting energy from the pedal crank to the coaster brake hub and thence to the wheel; an energy storage means for selectively storing energy and selectively applying the stored energy, the energy storage means being disposed in operable communication with the pedal crank for transmitting energy from the pedal crank to the energy storage means for storage of the energy, and the energy storage means being disposed in operable communication with the coaster brake hub for selectively transmitting stored energy from the energy storage means to the coaster brake hub; and, combining means for differentially combining instant energy supplied by the operator and the energy storage means so that the energy applied to the coaster brake hub is essentially the sum of the instant energy supplied by the operator and the energy storage means.

In accordance with another aspect of the present invention, a hybrid hub includes, in combination: (a) a hub body housing an axle concentric therewith about an axis; (b) a coaster mechanism disposed concentrically in the hub including: (1) a helical drive screw disposed rotatably about the axis; (2) a helical drive nut disposed in operable communication with the helical drive screw; and (3) a first drive gear disposed rotatably about the axis so that helical drive screw drives the helical drive nut into operable engagement with the first drive gear to rotate the first drive gear; and (c) a differential disposed concentrically in the hub including: (1) the first drive gear and a second drive gear disposed rotatably about the axis; (2) at least two spider gear shafts disposed radially to the axis and connecting rigidly to the hub housing; and (3) a spider gear disposed rotatably about each of the at least two spider gear shafts, each the spider gear having teeth which mesh with teeth of the first drive gear and the second drive gear.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
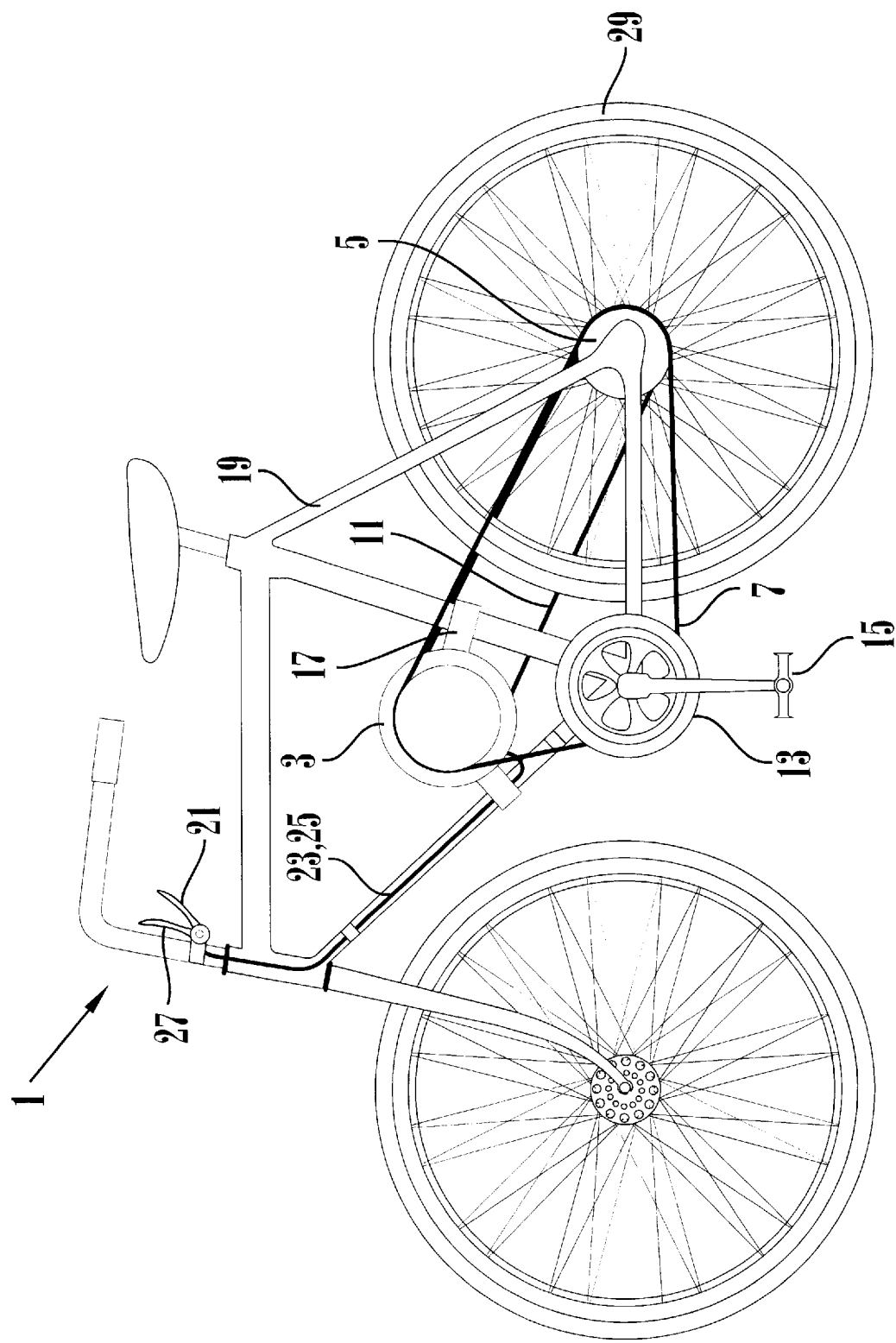
FIG. 1 is a side view of a bicycle having operably mounted thereon an energy storage device in accordance with an embodiment of the present invention.
Figure 2:
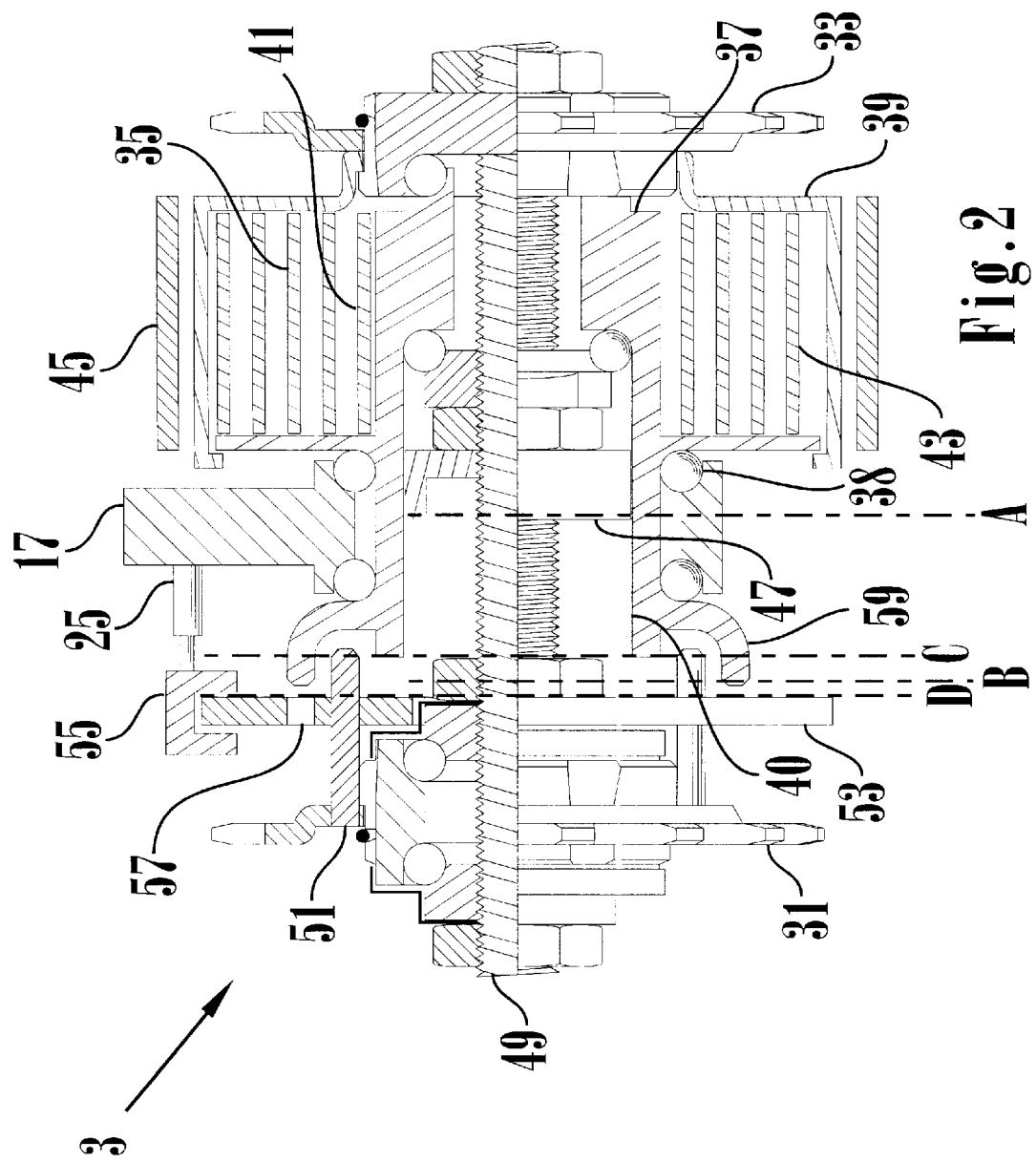
FIG. 2 is a schematic quarter section view of an energy storage device in accordance with an embodiment of the present invention.
Figure 3:
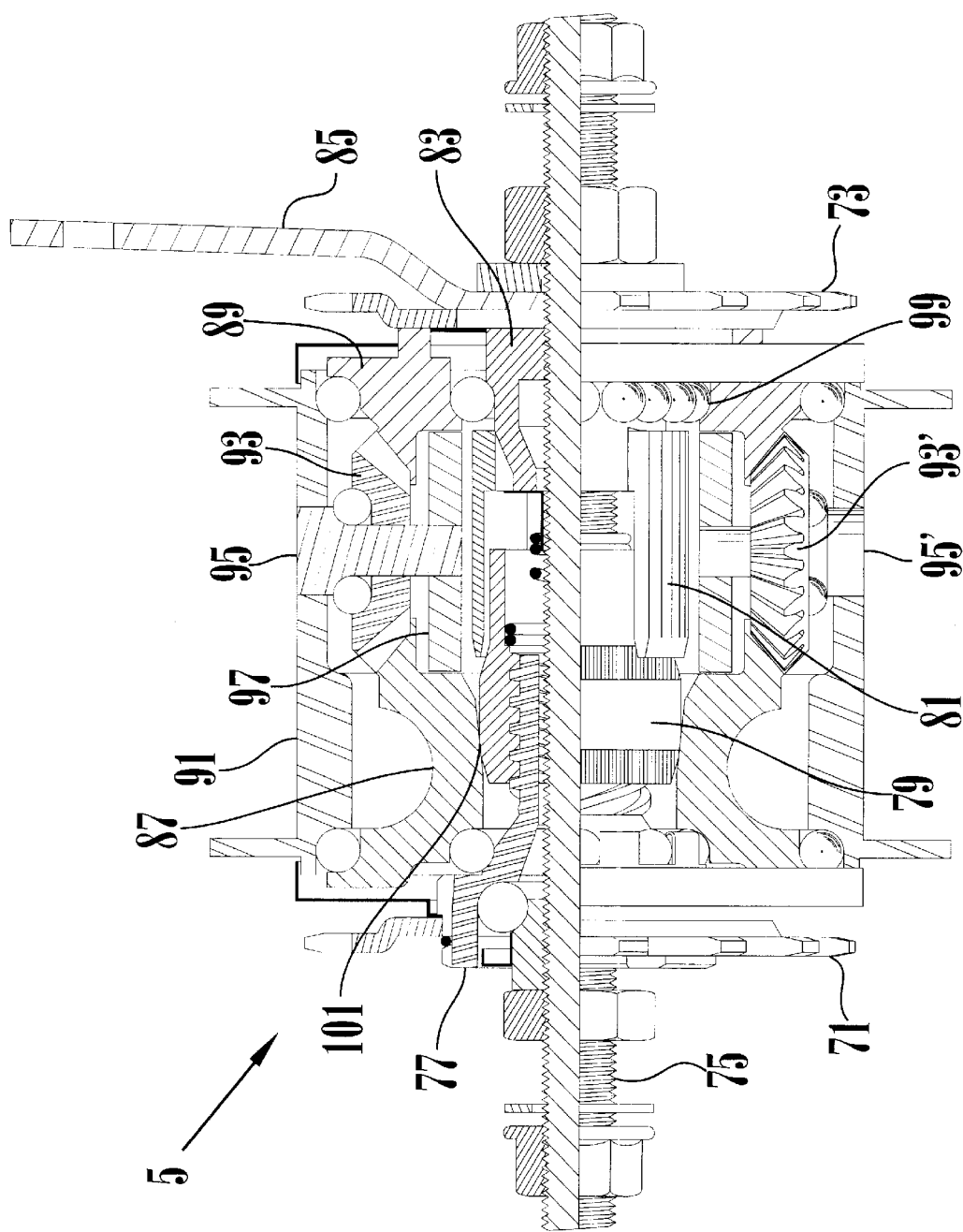
FIG. 3 is a schematic quarter section view of a differential energy input coaster brake hub in accordance with an embodiment of the present invention.

Referring now to FIGS. 1, 2, and 3, a preferred embodiment of the invention comprises separate components which work in combination to produce the most satisfactory results. FIG. 1 shows a bicycle 1 with an energy storage component (ESC) 3 linked to a differential energy input coaster brake hub (hybrid hub) 5. A plurality of drive chains—crank chain 7 and ESC-hub auxiliary chain 11—connects the chain ring 13 to the ESC 3 and the hub 5.

The chain ring 13 is first linked to the ESC 3 input sprocket 31 then to the first hub sprocket 71 via crank chain 7. Thus, energy originating from the operator through the pedals 15 supplies energy input to the ESC 3, while at the same time maintaining a positive drive connection to the hub 5 for continuous forward propulsion or braking.

Two chains (not illustrated) can be used in place of the crank chain 7 if the ESC input sprocket 31 is a double sprocket. A crank chain can link the chain ring 13 to the ESC input sprocket 31 and a second chain can link the ESC input sprocket 31 to the first hub sprocket 71. An advantage of such an arrangement would be the availability of a greater variety of different crank/ESC and crank/hub ratios, at the cost of greater complexity.

The auxiliary chain 11, located on the other side of the bicycle frame 19, connects the ESC output sprocket 33 to the rear hybrid hub second hub sprocket 73. This arrangement allows for the release of stored energy from the ESC 3 to be in the same direction of rotation as the input energy, with the advantage of not over running the pedals or the braking system.

The ESC 3 stores energy via a torsional energy storage spring 35—essentially a very long, thin beam cantilevered at the proximal end 41 thereof to and coiled around a rotatable input arbor 37 which is journaled to a support frame 17 which is rigidly mounted to the bicycle frame 19. Journal arrangements are shown generally with well known ball bearings and races which are unnumbered in order to avoid cluttered drawings.

The distal end 43 of the storage spring 35 is fixed to a rotatable output arbor 39, which preferably includes a housing which houses the storage spring 35. The output arbor 39, output sprocket 33, and threaded axle 49 rotate together and are concentric with and journaled to the input arbor 37. The output arbor 39 thus transfers its rotation directly to the output sprocket 33, and thence to the hub 5.

A stopping means 45, shown as an exterior brake shoe, selectively engages or disengages the housing to prevent or allow rotation thereof The stopping means 45 can comprise a friction device such as any of various known braking mechanisms, a pawl which engages splines, teeth, or the like, or any other mechanism for selectively engaging a rotating member to prevent rotation thereof FIG. 2 shows the stopping means as a strap type brake shoe which tightens around the outside of the output arbor 39. The stopping means 45 is operated via a push/pull type control cable 23 (shown superimposed with control cable 25) connected to a frame mounted ESC output control toggle lever 21.

To store energy in the storage spring 35, the input arbor 37 is rotated while the output arbor 39 is prevented from rotating by the stopping means 45. As the input arbor 37 rotates, the coils of the storage spring 35 become tightly wound around the input arbor 37 in the fashion of a mainspring, storing the energy required to rotate the input arbor 37. The input arbor 37 is prevented from reverse rotation by a unidirectional journal 38 or a ratchet mechanism.

To release the stored energy, the stopping means is released, allowing the tightly wound coils to expand and utilize the stored energy to turn the output arbor 39 and thence the output sprocket 33 and auxiliary chain 11. The spring 35 can be unwound partially or until it returns to the fully unwound position wherein all available stored energy has been utilized. The input arbor 37 can be stopped or continue to rotate during release of energy.

Positive engagement/disengagement type control means is essential for controlling the winding of the storage spring 35. Such control means should be capable of:

1. Selectively engaging the input sprocket 31 to the input arbor 37 whenever the storage spring 35 is not fully wound.
2. Selectively disengaging the input sprocket 31 from the input arbor 37 at any time.
3. Automatically disengaging the input sprocket 31 from the input arbor 37 when the storage spring 35 has fully wound in order to prevent the storage spring 35 from over winding.

Various known and used positive rotational engagement/disengagement mechanisms are suitable for performing the above enumerated functions of the control means, for example those using clutches, splines, teeth, and the like. One suitable control means is described as follows.

A nut 47 is slidably mounted in a cylindrical cavity 40 in one end of the input arbor 37, and is keyed, splined, pinned, or otherwise disposed therein so that the nut 47 must rotate with the input arbor 37. The nut 47 is threaded to the axle 49, which is disposed to rotate with the output arbor 39 and output sprocket 33.

From an initial position "A" wherein the storage spring 35 is in the fully unwound state, the nut, rotating on the threads of the axle 49 and sliding in the input arbor 37, translates to position "B" as the storage spring 35 is fully wound during input of energy thereto. As the storage spring 35 is unwound during utilization of stored energy, the nut returns to position "A". The distance along the axle from position "A" to position "B" is determined by the pitch of the axle threads multiplied by the number of turns necessary to wind the storage spring 35 from the fully unwound state to the fully wound state.

The input sprocket 31 is journaled to the axle and has primary power transfer pins 51 rigidly mounted thereto which protrude parallel to the axle toward the input arbor 37. A floating power transfer plate 53 is slidably mounted on the power transfer pins 51, and rotates therewith. The power transfer plate 53 is shown in position "D" where holes 57 are disengaged from secondary power transfer pins 59 which are part of, or are rigidly mounted to, the arbor 37. In position "C" holes 57 therein engage the secondary power transfer pins 59 to transfer rotation motion from the input sprocket 31 to the input arbor 37. The power transfer plate 53 is translated between into position "C" and into position "D" by a translating means, shown as a fork 55 (not to scale) which is operated via a push/pull type control cable 25 (shown superimposed with control cable 23) connected to a frame mounted ESC input control toggle lever 27.

The power transfer plate translating means preferably "snaps" into position "C" and into position "D" via well known urging means (not illustrated), for example a snap spring mechanism used in many light switches. This is to ensure that the power transfer plate 53 is not allowed to delay or linger between the two positions.

Via the crank chain 7, the input sprocket 31 rotates the power transfer plate 53 and thence the input arbor 37, to wind the storage spring 35 to the filly wound state at which point the nut 47 has translated from position "A" to position "B". In translating to position "B", the nut 47 contacts and pushes the power transfer plate 53 and causes the power transfer plate 53 to translate from position "C" and "snap" into position "D". In position "D" the power transfer plate 53 is out of contact with the nut 47 to prevent frictional contact therewith. Hence the storage spring 35 is protected from being over-wound.

Means is provided in the present invention for combining the instant energy supplied by the operator and the stored energy supplied by the ESC 3. The hybrid hub 5 is a unique integration of a well known and used coaster brake type rear hub and a differential featuring dual input sprockets 71, 73, providing independent left side and right side inputs to the drive wheel 29. An unexpected and beneficial result of this arrangement is that the independent sprockets 71, 73 can rotate at different speeds, thus allowing the operator of the bicycle I to pedal at any desired speed while the ESC 3 is releasing energy stored therein. The ESC 3 can apply energy to the drive wheel while operating at one speed while the operator is pedaling the bicycle 1 at another speed, with the hybrid hub 5 combining the two inputs so that the sum thereof is delivered to the drive wheel 29, as will be described hereinbelow.

Both the main crank chain 7 and the auxiliary chain 11 can drive the rear hub independently provided the operator is peddling; the outcome will be a net increase in speed. If the operator is coasting, the engagement of the ESC 3 will not impede coaster brake operation.

Coaster brake components include threaded axle 75, concentric helical drive screw 77 journaled to the axle 75 and driven by the first hub sprocket 71, helical drive nut 79, non-rotatable, sectional brake shoe 81, and stationary brake lever 85 which is attached to the bicycle frame. A brake shoe support collar 83, threaded onto the axle 75, is keyed to the brake shoe 81 and stationary brake lever 85 in order to prevent rotation of the brake shoe 81.

Differential components include a first drive gear 87 and a second drive gear 89. The drive gears are concentric with and journaled to the helical drive nut 79 and brake shoe support collar 83, respectively. The hub body 91 is concentric with and journaled at each end to each of the drive gears 87, 89.

A plurality of spider gears 93, 93' are disposed between and teeth thereof mesh with teeth of the drive gears 87, 89. The spider gears 93, 93' are journaled to and supported by spider gear shafts 95, 95' which are disposed radially to the axis of the rotation of the drive gears 87, 89 in order to rigidly connect the hub body 91 with an inner hub 97. The spider gears 93, 93' are preferably equally spaced around inner hub 97. 20 Energy is transmitted from the drive gears 87, 89 through the spider gears 93, 93', thence through the spider gear shafts 95, 95' to the hub body 91 and thence to the drive wheel 29.

The first drive gear 87 is adapted to be engaged by the helical drive nut 79 in order to transfer power from the first hub sprocket 71 to the spider gears 93, 93' and thence to the hub body 91. The second drive gear 89 is rigidly connected to the second hub sprocket 73 in order to transfer power to the spider gears 93, 93' and thence to the hub body 91. The second hub sprocket 73 and second drive gear 89 are prevented from reverse rotation by a unidirectional journal 99 or a ratchet mechanism.

The hybrid hub 5 gives a first hub sprocket 71 to hub ratio of 2:1 when the ESC 3 is inactive and a 1:1 ratio when the ESC 3 is active and rotating the second hub sprocket 73 at the same rate as the first hub sprocket 71. The 2:1 ratio is less than that of typical bicycles, which are normally 1:1. The relative sizes (in number of teeth) of the chain ring 13 and the first hub sprocket 71 should be adjusted to maintain typical speeds associated with the particular vehicle. A relatively large ESC input sprocket 31 will result in the ESC 3 being wound slowly, ensuring the operator's ability to supply enough power to propel the vehicle and wind the ESC 3 simultaneously.

During forward pedaling operation, the first hub sprocket 71 turns the helical drive screw 77 which tightens the helical drive nut 79 against the gripping surface 101 inside of the first drive gear 87. The rotation of the first drive gear 87 is transferred through the spider gears 93, 93' and spider gear shafts 95, 95' to the hub body, and thence to the drive wheel 29. The second drive 89 gear is prevented from rotating in reverse by the unidirectional journal 99.

During coasting operation, the first hub sprocket 71 is stopped and the rotation of the first drive gear 87 moves the helical drive nut 79 out of operable contact therewith. The hub then freely rotates.

During braking operation, the first sprocket 71 is rotated backwards so that the helical drive screw 77 drives the helical drive nut 79 into brake shoe 81, which expands with braking friction against the inside of the inner hub 97. The second hub sprocket 73 and respective second drive gear 89 do not operate the coaster brake mechanism.

An unexpected advantage of the present invention is that the coaster brake mechanism of the hybrid hub 5 can be activated, with the application of normal pedal forces, even when the ESC 3 is operating at peak output, as will be elucidated hereinbelow.

Usage of the combination of the ESC 3 and the hybrid hub 5 is as follows. The operator engages the stopping means 45 and the control means as described hereinabove, and pedals the bicycle to wind the energy storage spring 35. The operator can allow the ESC 3 to wind fully and stop winding automatically as described hereinabove, or selectively stop the winding process by moving the ESC input control toggle lever 27 to disengage the control means.

The operator begins a steep climb where the stored energy is needed and engages the ESC 3 via the ESC output control lever 21 to initiate the release of energy to the second hub sprocket 73. The operator continues to pedal with sufficient effort to keep the helical drive nut 79 in contact with the first drive gear 87 during the release of the stored energy.

Energy input from the ESC 3 through the second hub sprocket 73, rotates the second drive gear 89 to rotate the hub body 91 and drive wheel 29 at a speed essentially consistent with the sum of the instant input from the operator plus the input of energy from the ESC 3.

The present invention has an unexpected and important safety feature. In the event that the operator engages the ESC 3 while coasting or is unable to maintain positive contact with the pedals, the helical drive nut 79 breaks contact with the first drive gear 87, and the energy input from the ESC 3 dissipates via unrestrained rotation of the spider gears 93, 93' and counter-rotation of the first drive gear 87. The same result will be obtained when the coaster brake and ESC 3 are applied simultaneously. Thus, the ESC cannot over-speed the vehicle or cause the operator to lose control thereof The hybrid hub is also suitable for tandem bicycle applications. The front crank/chain ring turns one input sprocket while the rear crank/chain ring turns the other input sprocket. Thus, two operators thereof can pedal at different speeds, with power delivered to the drive wheel 29 being essentially the sum of the two inputs.

While there has been shown and described what are at present considered the preferred embodiments of the invention, it will be obvious to those skilled in the art that various changes and modifications can be made therein without departing from the scope of the inventions defined by the appended claims.

What is claimed is:

1. An energy storage device comprising, in combination:
   a. a vehicle adapted for propulsion via energy supplied by an operator, said vehicle having a pedal crank and a coaster brake hub disposed about an axle of a wheel of said vehicle, said pedal crank and said coaster brake hub being disposed in operable communication for transmitting energy from said pedal crank to said coaster brake hub and thence to said wheel;
   b. an energy storage means for selectively storing energy and selectively applying the stored energy, said energy storage means being disposed in operable communication with said pedal crank for transmitting energy from said pedal crank to said energy storage means for storage of the energy, and said energy storage means being disposed in operable communication with said coaster brake hub for selectively transmitting stored energy from said energy storage means to said coaster brake hub; and, c. combining means for differentially combining instant energy supplied by said operator and said energy storage means so that the energy applied to said coaster brake hub is essentially the sum of said instant energy supplied by said operator and said energy storage means.

2. An energy storage device in accordance with claim 1 wherein said vehicle comprises a bicycle.

3. An energy storage device in accordance with claim 1 wherein said energy storage means comprises a spring which is selectively wound to store energy, and selectively unwound to release said stored energy.

4. An energy storage device in accordance with claim 3 wherein said vehicle comprises a bicycle.

5. An energy storage device in accordance with claim 4 wherein said bicycle further comprises at least one lever mounted thereon for operating said energy storage means.

6. An energy storage device in accordance with claim 1 wherein said combining means comprises, in combination:

a. a hub body housing an axle concentric therewith about an axis;

b. a coaster mechanism disposed concentrically in said hub comprising:
  (1) a helical drive screw in operable relationship with said pedal crank and disposed rotatably about said axis;
  (2) a helical drive nut disposed in operable communication with said helical drive screw; and
  (3) a first drive gear disposed rotatably about said axis so that helical drive screw drives said helical drive nut into operable engagement with said first drive gear to rotate said first drive gear; and c. a differential disposed concentrically in said hub comprising:
  (1) said first drive gear and a second drive gear in operable relationship with said energy storage means and disposed rotatably about said axis;
  (2) at least two spider gear shafts disposed radially to said axis and connecting rigidly to said hub housing; and
  (3) a spider gear disposed rotatably about each of said at least two spider gear shafts, each said spider gear having teeth which mesh with teeth of said first drive gear and said second drive gear.

7. An energy storage device in accordance with claim 6 wherein said vehicle comprises a bicycle.

* * * * *